Patented Feb. 10, 1931

1,791,918

UNITED STATES PATENT OFFICE

KAZUYOSHI YAMAJI, OF TOKYO, JAPAN

POWDERED DEODORIZER FOR THE ACCELERATION OF RIPENING OF ORGANIC FERTILIZERS

No Drawing.   Application filed August 1, 1929. Serial No. 382,838.

This invention relates to the powdered deodorizer adopted for the ripening of organic fertilizers. The object thereof is to mix it with such organic fertilizers as the excrement of live stock, fish or animal manure, etc. so as not only to accelerate their ripening, but to prevent the growth of harmful bacteria and the escapement of the ammonia which is the last product of the decomposition and at the same time to stop the disagreeable odor produced from these kinds of manures.

The matters discharged by animals more or less vary according to animals and the food taken by them, but consist principally of protein, for example, albumin, globulin, nuclein, peptone, mucin and their decomposition products and nextly of carbohydrate, for instance, starch, cellulose, sugars and organic acids. These matters, when decomposed, usually produce substances of disagreeable odor such as indol, skatol and other sulphides. The known deodorizer does not remove these substances of disagreeable smell, but simply offsets the disagreeable odor temporarily by its own good smell and does not prevent the production of these substances. Also, when various kinds of excrement are used as fertilizers, they must be ripened, and no deodorizer has ever been known to accelerate the ripening of fertilizers and at the same time to stop the offensive odor caused by their decomposition. However, the deodorizer produced by the present invention ripens rapidly such organic fertilizers as animal excrement, fish manure, night-soil, etc. when it is mixed with them. Moreover, it prevents not only the growth of harmful bacteria, but also the escape of ammonia, the last product of the decomposition, and at the same time stops the disagreeable odor caused by the decomposition of the fertilizers. The essential feature of this invention consists in mixing dried and powdered cereal containing a large quantity of enzyme with rice-bran, barley-bran or wheat-bran and adding a small quantity of water thereto, after which it is heaped for fermentation and then is dried and powdered and finally is mixed with tricalcium phosphate and powder of germinated seeds of cereal such as barley, wheat, bean, etc. which contain a large quantity of enzyme. If this deodorizer is sprinkled in water closets or on other filthy matters or various kinds of organic fertilizers, it will saccharify the starch by the powerful enzyme contained therein and supply sufficient nutrition to yeasts and bacteria so as to make their breeding vigorous and thus drive out the other harmful bacteria. On the other hand, it accelerates the decomposition of albumen and converts it into an intermediate product free from unpleasant smell. Also, it fixes the ammonia produced by the organic acid and the superphosphate produced by enzyme and prevents its escape and thoroughly suppresses its bad smell.

The following is an example of carrying this invention into practice:—

Mix well about 3.75 kilograms of dried and powdered cereals containing a large quantity, preferably of hydrolytic and proteolitic enzyme, for instance, barley, wheat or bean with about 37.5 kilograms of rice-bran, barley-bran or wheat-bran and add thereto about 24 litres of water. Then, heap the mixture for fermentation, after which it is dried and powdered and finally is mixed with about 3.75 kilograms of dried and powdered germinated cereal containing a large quantity of enzyme, for example, barley, wheat or bean and about 3.75 kilograms of tricalcium phosphate. The above mixture, when added to organic fertilizer, accelerates its ripening, and, when sprinkled in places which usually emit unpleasant odors, such for instance as water closets, eliminates such odors.

I claim:

A process for making powdered deodorizer for accelerating the ripening of organic fertilizers, which comprises mixing powder of cereal containing a large quantity of enzyme with bran, adding water thereto and heaping the mixture for fermentation, after which it is dried and powdered and then is mixed with dried and powdered germinated seeds of cereal containing a large quantity of enzyme and also adding tricalcium phosphate to the mixture.

In testimony whereof I have signed my name to this specification.

KAZUYOSHI YAMAJI.